United States Patent
Kajiyama et al.

(10) Patent No.: US 12,255,544 B2
(45) Date of Patent: Mar. 18, 2025

(54) POWER CONVERSION DEVICE THAT PERFORMS POWER CONVERSION BETWEEN DC CIRCUIT AND AC CIRCUIT

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Ryosuke Uda, Tokyo (JP); Yoshiyuki Kono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 153 days.

(21) Appl. No.: 17/791,605

(22) PCT Filed: Mar. 11, 2020

(86) PCT No.: PCT/JP2020/010633
§ 371 (c)(1),
(2) Date: Jul. 8, 2022

(87) PCT Pub. No.: WO2021/181583
PCT Pub. Date: Sep. 16, 2021

(65) Prior Publication Data
US 2023/0035598 A1    Feb. 2, 2023

(51) Int. Cl.
*H02M 7/483*      (2007.01)
*H02M 7/5395*    (2006.01)

(52) U.S. Cl.
CPC ....... *H02M 7/4833* (2021.05); *H02M 7/4835* (2021.05); *H02M 7/5395* (2013.01)

(58) Field of Classification Search
CPC ...... H02M 7/537; H02M 1/32; H02M 7/4835; H02M 7/539
See application file for complete search history.

(56) References Cited

U.S. PATENT DOCUMENTS 10,256,745 B2 *   4/2019   Nami ................ H02M 1/32
10,560,014 B2 *   2/2020   Chivite-Zabalza ..... H02J 7/345
(Continued)

FOREIGN PATENT DOCUMENTS

JP         6509352 B2    5/2019
WO    2019138550 A1   7/2019

OTHER PUBLICATIONS

Communication pursuant to Article 94(3) EPC dated Dec. 4, 2023, issued in the corresponding European Patent Application No. 20923720.5, 6 pages.
(Continued)

*Primary Examiner* — Yusef A Ahmed
(74) *Attorney, Agent, or Firm* — BUCHANAN, INGERSOLL & ROONEY PC

(57) ABSTRACT

A power conversion device includes a power conversion circuit unit including a plurality of leg circuits, and a control device. Each of the leg circuits includes a plurality of first converter cells each having a capacitor and connected in series to each other and a plurality of second converter cells each having the capacitor and connected in series to each other. The plurality of first converter cells are controlled not based on a circulating current circulating between the plurality of leg circuits, and the plurality of second converter cells are controlled based on the circulating current. The control device executes control processing for increasing a current flowing through the second converter cell when a voltage at the capacitor in the second converter cell is less than a first threshold value.

17 Claims, 6 Drawing Sheets

(56) References Cited

U.S. PATENT DOCUMENTS

| | | | |
|---|---|---|---|
| 11,563,385 B2* | 1/2023 | Biris | H02M 7/4835 |
| 12,107,488 B2* | 10/2024 | Delzenne | H02M 1/32 |
| 2012/0026767 A1* | 2/2012 | Inoue | H01F 27/42 |
| | | | 363/78 |
| 2012/0243282 A1* | 9/2012 | Marquardt | H02M 7/4835 |
| | | | 363/132 |
| 2013/0063995 A1* | 3/2013 | Norrga | H02M 7/4835 |
| | | | 363/125 |
| 2013/0208519 A1* | 8/2013 | Yamamoto | H02M 7/48 |
| | | | 363/67 |
| 2014/0016379 A1* | 1/2014 | Yamamoto | H02M 5/44 |
| | | | 363/37 |
| 2014/0226373 A1* | 8/2014 | Park | H02M 7/483 |
| | | | 363/35 |
| 2015/0349520 A1* | 12/2015 | Davidson | H02M 7/4835 |
| | | | 361/57 |
| 2016/0013716 A1* | 1/2016 | Hur | H02M 7/4835 |
| | | | 363/50 |
| 2016/0036314 A1* | 2/2016 | Koyanagi | H02M 7/483 |
| | | | 363/65 |
| 2016/0233758 A1* | 8/2016 | Eckel | H02M 7/4835 |
| 2016/0308373 A1* | 10/2016 | Geske | H02M 7/483 |
| 2016/0329831 A1* | 11/2016 | Mukunoki | H02M 1/08 |
| 2017/0012521 A1* | 1/2017 | Jimichi | H02M 7/4835 |
| 2017/0047727 A1* | 2/2017 | Cao | H02M 1/32 |
| 2017/0047860 A1* | 2/2017 | Fujii | H02M 7/2173 |
| 2017/0070047 A1* | 3/2017 | Shen | H02M 7/4835 |
| 2017/0214334 A1* | 7/2017 | Mukunoki | H02M 7/217 |
| 2017/0288569 A1* | 10/2017 | Uda | H02M 7/537 |
| 2017/0310237 A1* | 10/2017 | Uda | H02H 1/1257 |
| 2017/0358999 A1* | 12/2017 | Geske | H02M 1/32 |
| 2018/0069488 A1* | 3/2018 | Mukunoki | H02M 7/483 |
| 2018/0076734 A1* | 3/2018 | Jimichi | H02M 7/003 |
| 2018/0083550 A1* | 3/2018 | Chung | H02M 7/5388 |
| 2018/0138826 A1* | 5/2018 | Jimichi | H02J 3/1857 |
| 2018/0159422 A1* | 6/2018 | Kikuchi | H02M 7/12 |
| 2018/0287509 A1* | 10/2018 | Fujii | H02M 7/4835 |
| 2018/0302003 A1* | 10/2018 | Mori | H02M 7/17 |
| 2019/0028021 A1* | 1/2019 | Chivite-Zabalza | H02J 7/345 |
| 2019/0044427 A1* | 2/2019 | Fujii | H02M 7/483 |
| 2019/0044455 A1* | 2/2019 | Fujii | H02M 7/4835 |
| 2019/0068076 A1* | 2/2019 | Uda | H02M 7/483 |
| 2019/0207533 A1* | 7/2019 | Kikuchi | H02M 7/48 |
| 2019/0312504 A1* | 10/2019 | Kim | H02M 1/32 |
| 2019/0386578 A1* | 12/2019 | Kajiyama | H02H 7/1216 |
| 2020/0127583 A1* | 4/2020 | Adachi | H02M 7/797 |
| 2020/0177097 A1* | 6/2020 | Takahashi | H02M 7/5387 |
| 2020/0343717 A1* | 10/2020 | Kontos | H02M 1/32 |
| 2021/0058007 A1* | 2/2021 | Hario | H02M 7/4835 |
| 2021/0091660 A1* | 3/2021 | Takahashi | H02M 1/32 |
| 2021/0091661 A1* | 3/2021 | Kono | H02M 7/4835 |
| 2021/0135597 A1* | 5/2021 | Hario | H02M 7/48 |
| 2021/0408895 A1* | 12/2021 | Kajiyama | H02M 7/53871 |
| 2021/0408937 A1* | 12/2021 | Bhattacharya | H02M 1/0003 |
| 2022/0014114 A1* | 1/2022 | Kajiyama | H02M 7/4833 |
| 2022/0029524 A1* | 1/2022 | Kajiyama | H02M 1/32 |
| 2022/0045624 A1* | 2/2022 | Takahashi | H02M 1/32 |
| 2022/0311328 A1* | 9/2022 | Tahata | H02M 1/32 |
| 2022/0337173 A1* | 10/2022 | Nakamura | H02M 7/797 |
| 2022/0352810 A1* | 11/2022 | Lee | H02M 7/4835 |
| 2022/0393616 A1* | 12/2022 | Fujiwara | H02M 7/5395 |
| 2023/0018083 A1* | 1/2023 | Kajiyama | H02M 1/12 |
| 2023/0035598 A1* | 2/2023 | Kajiyama | H02M 7/4833 |
| 2023/0041013 A1* | 2/2023 | Nakayama | H02M 7/4835 |
| 2023/0049159 A1* | 2/2023 | Tanaka | H02M 7/537 |
| 2023/0056080 A1* | 2/2023 | Kajiyama | H02M 1/0025 |
| 2023/0066656 A1* | 3/2023 | Kajiyama | H02M 7/217 |
| 2023/0124367 A1* | 4/2023 | Kajiyama | H02M 7/4833 |
| | | | 363/35 |
| 2023/0147142 A1* | 5/2023 | Kono | H02M 1/0067 |
| | | | 307/82 |
| 2023/0163694 A1* | 5/2023 | Fujiwara | H02M 1/0025 |
| | | | 363/71 |
| 2023/0170822 A1* | 6/2023 | Fujiwara | H02M 1/0009 |
| | | | 363/68 |
| 2023/0231467 A1* | 7/2023 | Nakayama | H02M 1/0025 |
| | | | 363/13 |
| 2023/0361690 A1* | 11/2023 | Nakamura | H02M 5/458 |
| 2023/0369956 A1* | 11/2023 | Nakamura | H02M 1/325 |
| 2024/0022183 A1* | 1/2024 | Kajiyama | H02M 1/322 |
| 2024/0380201 A1* | 11/2024 | Imada | H02J 3/001 |

OTHER PUBLICATIONS

Extended European Search Report dated Mar. 20, 2023, issued in the corresponding European Patent Application No. 20923720.5, 11 pages.

Perez, et al., "Generalized Modeling and Simulation of a Modular Multilevel Converter", IEEE International Symposium on Industrial Electronics, Jun. 27, 2011, pp. 1863-1868.

International Search Report (PCT/ISA/210) with translation and Written Opinion (PCT/ISA/237) mailed on Jun. 30, 2020, by the Japan Patent Office as the International Searching Authority for International Application No. PCT/JP2020/010633. (8 pages).

* cited by examiner

POWER CONVERSION DEVICE THAT PERFORMS POWER CONVERSION BETWEEN DC CIRCUIT AND AC CIRCUIT

TECHNICAL FIELD

The present disclosure relates to a power conversion device that performs power conversion between an alternating current and a direct current.

BACKGROUND ART

A modular multilevel converter (hereinafter, also referred to as an MMC converter) in which a plurality of unit converters are connected in cascade can easily cope with an increase in voltage by increasing the number of unit converters. The "unit converter" is also referred to as a "converter cell" or a "sub-module". The MMC converter is widely applied to a transmission and distribution system as a large-capacity static reactive power compensator or an AC-DC power conversion device for high-voltage DC power transmission. The converter cell includes a plurality of switching elements and a power storage element, and is configured of a chopper circuit, a bridge circuit, or the like.

A method for dividing a plurality of converter cells in an arm into two cell groups is known in the MMC converter. For example, in Japanese Patent No. 6509352 (PTL 1), an AC-DC conversion operation is performed by one cell group, and a circulating current is controlled by the other cell group.

CITATION LIST

Patent Literature

PTL 1: Japanese Patent No. 6509352

SUMMARY OF INVENTION

Technical Problem

However, in the method in which the other cell group controls only the circulating current as in PTL 1, when both active power and reactive power output from the power conversion device are small, the voltage at the capacitor included in the other cell group cannot be maintained, and there is a possibility that converter control fails. Accordingly, the voltage at the capacitor included in one cell group and the voltage at the capacitor included in the other cell group are required to be appropriately controlled.

An object of one aspect of the present disclosure is to provide a power conversion device capable of appropriately controlling the voltage at the capacitor included in each cell group even when one cell group and the other cell group perform different operations.

Solution to Problem

According to an embodiment, a power conversion device that performs power conversion between a DC circuit and an AC circuit is provided. A power conversion device includes a power conversion circuit unit including a plurality of leg circuits corresponding to a plurality of phases of an AC circuit. Each of the leg circuits includes a plurality of first converter cells each having a capacitor and connected in series to each other and a plurality of second converter cells each having a capacitor and connected in series to each other. The power conversion device further includes a control device that controls operations of each first converter cell and each second converter cell. The plurality of first converter cells are controlled not based on the circulating current circulating between the plurality of leg circuits, and the plurality of second converter cells are controlled based on the circulating current. When a voltage at the capacitor in the second converter cell becomes less than a first threshold, the control device executes control processing for increasing a current flowing through the second converter cell.

Advantageous Effects of Invention

According to the present disclosure, even when one cell group and the other cell group perform different operations, the voltage at the capacitor included in each cell group can be appropriately controlled.

DESCRIPTION OF EMBODIMENTS

Figure 1:
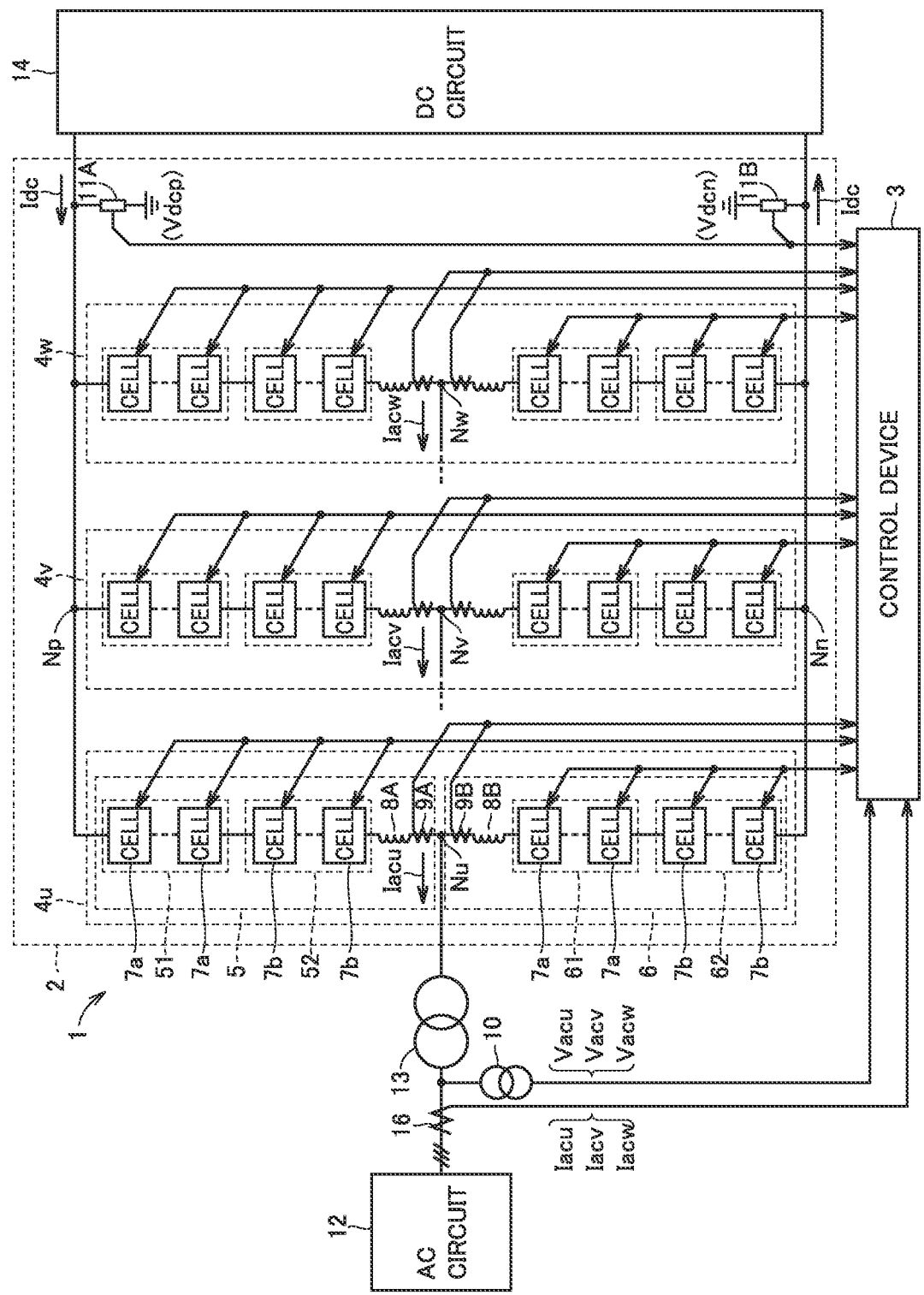
FIG. 1 is a schematic configuration diagram illustrating a power conversion device.

With reference to the drawings, embodiments of the present disclosure will be described below. In the following description, the same component is denoted by the same reference numeral. Those names and functions are the same. Thus, the detailed description thereof will not be repeated.

First Embodiment

<Schematic Configuration of Power Conversion Device>

FIG. 1 is a schematic configuration diagram illustrating a power conversion device. With reference to FIG. 1, a power conversion device 1 is configured of a modular multilevel converter including a plurality of converter cells (corresponding to "cell" in FIG. 1) connected in series to each other. Power conversion device 1 performs power conversion between a DC circuit 14 and an AC circuit 12. Power conversion device 1 includes a power conversion circuit unit 2 and a control device 3.

Power conversion circuit unit 2 includes a plurality of leg circuits 4u, 4v, 4w (hereinafter, also collectively referred to as "leg circuits 4") connected in parallel to each other between a positive-side DC terminal (that is, a high-potential-side DC terminal) Np and a negative-side DC terminal (that is, a low-potential-side DC terminal) Nn.

Leg circuit 4 is provided in each of a plurality of phases constituting an alternating current. Leg circuit 4 is connected between AC circuit 12 and DC circuit 14, and performs the power conversion between both the circuits. FIG. 1 illustrates a case where AC circuit 12 is a three-phase AC system, and three leg circuits 4u, 4v, 4w are provided corresponding to a U-phase, a V-phase, and a W-phase, respectively.

AC terminals Nu, Nv, Nw provided in leg circuits 4u, 4v, 4w are connected to AC circuit 12 through a transformer 13. For example, AC circuit 12 is an AC power system including an AC power supply and the like. In FIG. 1, connection between AC terminals Nv, Nw and transformer 13 is not illustrated for ease of illustration.

A positive-side DC terminal Np and a negative-side DC terminal Nn that are commonly connected to each leg circuit 4 are connected to DC circuit 14. For example, DC circuit 14 is a DC terminal of a DC power system including a DC power supply network or the like or another power conversion device. In the latter case, a back to back (BTB) system connecting AC power systems having different rated frequencies or the like is configured by coupling two power conversion devices.

Instead of use of transformer 13 in FIG. 1, power conversion device 1 may be connected to AC circuit 12 through an interconnection reactor. A primary winding may be provided in each of leg circuits 4u, 4v, 4w instead of AC terminals Nu, Nv, Nw, and leg circuits 4u, 4v, 4w may be connected to transformer 13 or the interconnection reactor in terms of AC through a secondary winding magnetically coupled to the primary winding. In this case, the primary winding may be set to following reactors 8A, 8B. That is, leg circuit 4 is electrically (that is, in terms of DC or AC) connected to AC circuit 12 through a connection portion provided in each of leg circuits 4u, 4v, 4w, such as AC terminals Nu, Nv, Nw or the primary winding.

Leg circuit 4u includes two arms connected in series. Specifically, leg circuit 4u includes a positive-side arm 5 from positive-side DC terminal Np to AC terminal Nu and a negative-side arm 6 from negative-side DC terminal Nn to AC terminal Nu. The positive-side arm is also referred to as an upper arm, and the negative-side arm is also referred to as a lower arm. AC terminal Nu that is a connection point between positive-side arm 5 and negative-side arm 6 is connected to transformer 13. Positive-side DC terminal Np and negative-side DC terminal Nn are connected to DC circuit 14. Hereinafter, leg circuit 4u will be described below as a representative because leg circuits 4v, 4w have the same configuration.

Positive-side arm 5 includes a cell group 51 in which a plurality of converter cells 7a are cascade-connected, a cell group 52 in which a plurality of converter cells 7b are cascade-connected, and reactor 8A. Cell group 51, cell group 52, and reactor 8A are connected in series to each other. Negative-side arm 6 includes a cell group 61 in which the plurality of converter cells 7a are cascade-connected, a cell group 62 in which the plurality of converter cells 7b are cascade-connected, and reactor 8B. Cell group 61, cell group 62, and reactor 8B are connected in series to each other.

In the following description, the number of converter cells 7a included in each of cell group 51 and cell group 61 is set to N1. Where, N1≥2. The number of converter cells 7b included in each of cell group 52 and cell group 62 is set to N2. Where, N2≥1. In the following description, sometimes converter cells 7a and 7b are collectively referred to as a converter cell 7. For ease of illustration, the plurality of converter cells 7a are disposed adjacent to each other and the plurality of converter cells 7b are disposed adjacent to each other in each arm, but limitation to the configuration is not intended. The plurality of converter cells 7a may be disposed in a dispersed manner, and the plurality of converter cells 7b may be disposed in a dispersed manner. Each of the plurality of converter cells 7 included in each leg circuit 4 is converter cell 7a or converter cell 7b.

A position where reactor 8A is inserted may be any position of positive-side arm 5 of leg circuit 4u, and a position where reactor 8B is inserted may be any position of negative-side arm 6 of leg circuit 4u. A plurality of reactors 8A and a plurality of reactors 8B may be provided. Inductance values of the reactors may be different from each other. Only reactor 8A of positive-side arm 5 or only reactor 8B of negative-side arm 6 may be provided.

Although details will be described later, cell groups 51, 61 and the cell groups 52, 62 have different roles. Specifically, converter cell 7a of cell groups 51, 61 is not used for controlling the circulating current, but is in charge of controlling (that is, AC-DC conversion control) an AC electric quantity and a DC electric quantity, and converter cell 7b of cell groups 52, 62 is in charge of controlling the circulating current.

Power conversion device 1 includes an AC voltage detector 10, an AC current detector 16, DC voltage detectors 11A, 11B, and arm current detectors 9A, 9B provided in each leg circuit 4 as detectors that measure an electric quantity of (for example, current and voltage) used for control. Signals detected by these detectors are input to control device 3.

In FIG. 1, for ease of illustration, a signal line of the signal input from each detector to control device 3 and a signal line of the signal input and output between control device 3 and each converter cell 7 are partially collectively illustrated, but are actually provided for each detector and each converter cell 7. The signal line between each converter cell 7 and control device 3 may be provided separately for transmission and for reception. For example, the signal line is formed of an optical fiber.

AC voltage detector 10 detects a U-phase AC voltage Vacu, a V-phase AC voltage Vacv, and a W-phase AC voltage Vacw of AC circuit 12. AC current detector 16 detects a U-phase AC current Iacu, a V-phase AC current Iacv, and a W-phase AC current Iacw of AC circuit 12. DC voltage detector 11A detects a DC voltage Vdcp of positive-side DC terminal Np connected to DC circuit 14. DC voltage detector 11B detects a DC voltage Vdcn of negative-side DC terminal Nn connected to DC circuit 14.

Arm current detectors 9A, 9B provided in U-phase leg circuit 4u detect a positive-side arm current Ipu flowing through positive-side arm 5 and a negative-side arm current Inu flowing through negative-side arm 6. Arm current detectors 9A, 9B provided in V-phase leg circuit 4v detect a positive-side arm current Ipv and a negative-side arm current Inv. Arm current detectors 9A, 9B provided in W-phase leg circuit 4w detect a positive-side arm current Ipw and a negative-side arm current Inw. In the following description, positive-side arm currents Ipu, Ipv, Ipw are collectively referred to as a positive-side arm current Iarmp, negative-side arm currents Inu, Inv, Inw are collectively referred to as a negative-side arm current Iarmn, and positive-side arm current Iarmp and negative-side arm current Iarmn are collectively referred to as an arm current Iarm. In arm current Iarm, a current flowing from positive-side DC terminal Np toward negative-side DC terminal Nn is set to positive.

Control device 3 may be configured of a dedicated circuit, and a part or all of the dedicated circuit may be configured of a field programmable gate array (FPGA), a microprocessor, or the like. Typically, control device 3 includes an auxiliary transformer, an analog to digital (AD) converter, an arithmetic unit, and the like as a hardware configuration. The arithmetic unit includes a central processing unit (CPU), a random access memory (RAM), and a read only memory (ROM). The AD converter includes an analog filter, a sample hold circuit, and a multiplexer. For example, control device 3 may be configured of a digital protection control device.

Configuration Example of Converter Cell

Figure 2:
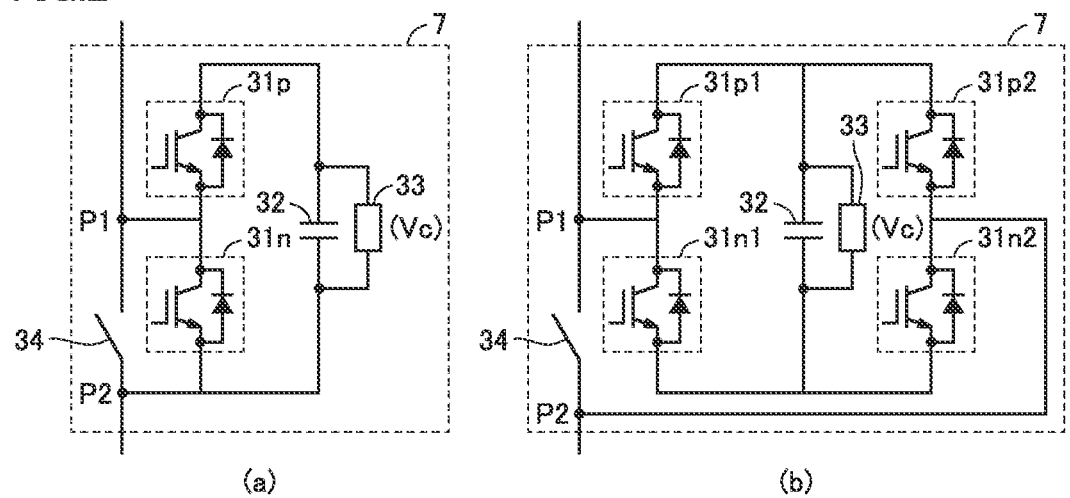
FIG. 2 is a circuit diagram illustrating an example of a converter cell constituting a cell group.

FIG. 2 is a circuit diagram illustrating an example of the converter cell constituting the cell group. Converter cell 7 in FIG. 2(a) has a circuit configuration called a half-bridge configuration. Converter cell 7 includes a series body formed by connecting two switching elements 31p, 31n in series, a capacitor 32 as an energy accumulator, a bypass switch 34, and a voltage detector 33. The series body and capacitor 32 are connected in parallel. Voltage detector 33 detects a capacitor voltage Vc that is the voltage at both ends of capacitor 32.

Converter cell 7 in FIG. 2(b) has a circuit configuration called a full-bridge configuration. Converter cell 7 includes a first series body formed by connecting two switching elements 31p1, 31n1 in series, a second series body formed by connecting two switching elements 31p2, 31n2 in series, capacitor 32, bypass switch 34, and voltage detector 33. The first series body, the second series body, and capacitor 32 are connected in parallel. Voltage detector 33 detects capacitor voltage Vc.

Two switching elements 31p, 31n in FIG. 2(a) and four switching elements 31p1, 31n1, 31p2, 31n2 in FIG. 2(b) are configured such that a freewheeling diode (FWD) is connected in antiparallel to a self-arc-extinguishing semiconductor switching element such as an insulated gate bipolar transistor (IGBT), a gate commutated turn-off (GCT) thyristor, or a metal oxide semiconductor field effect transistor (MOSFET). In FIGS. 2(a) and 2(b), a capacitor such as a film capacitor is mainly used as capacitor 32.

In the following description, switching elements 31p, 31n, 31p1, 31n1, 31p2, 31n2 are also collectively referred to as a switching element 31. In addition, on and off of the semiconductor switching element in switching element 31 will be simply referred to as "on and off of switching element 31".

With reference to FIG. 2(a), both terminals of switching element 31n are referred to as input and output terminals P1, P2. Voltage across capacitor 32 and zero voltage are output by switching operations of switching elements 31p, 31n. For example, when switching element 31p is turned on and when switching element 31n is turned off, the voltage across capacitor 32 is output. When switching element 31p is turned off and when switching element 31n is turned on, zero voltage is output. In FIG. 2(a), both terminals of switching element 31n are set as input and output terminals P1, P2, but both terminals of switching element 31p may be set as input and output terminals P1, P2, and in this case, the operation is reversed.

Bypass switch 34 is connected between input and output terminals P1, P2. In FIG. 2(a), bypass switch 34 is connected in parallel to switching element 31n. However, when both terminals of switching element 31p are input and output terminals P1, P2, bypass switch 34 is connected in parallel to switching element 31p. Converter cell 7 is short-circuited by turning on bypass switch 34.

With reference to FIG. 2(b), a midpoint between switching element 31p1 and switching element 31n1 and a midpoint between switching element 31p2 and switching element 31n2 are set to input and output terminals P1, P2 of converter cell 7. Converter cell 7 in FIG. 2(b) outputs positive voltage or zero voltage by constantly turning on switching element 31n2, constantly turning off switching element 31p2, and alternately turning on switching elements 31p1, 31n1. In addition, converter cell 7 in FIG. 2(b) can output zero voltage or negative voltage by constantly turning off switching element 31n2, constantly turning on switching element 31p2, and alternately turning on switching elements 31p1, 31n1.

Bypass switch 34 is connected between input and output terminals P1, P2. Bypass switch 34 is connected in parallel to the series body of switching elements 31n1, 31n2. Converter cell 7 is short-circuited by turning on bypass switch 34.

In the following description, the case where converter cells 7a, 7b are configured as a half-bridge cell in FIG. 2(a) and the semiconductor switching element and the capacitor as the energy accumulation element are used will be described as an example. However, converter cells 7a, 7b may have a full-bridge configuration in FIG. 2(b). A converter cell other than the configuration described above, for example, a converter cell to which a circuit configuration called a clamped double cell or the like is applied may be used, and the switching element and the energy accumulation element are not limited to those described above.

<Configuration of Control Device 3>

Figure 3:
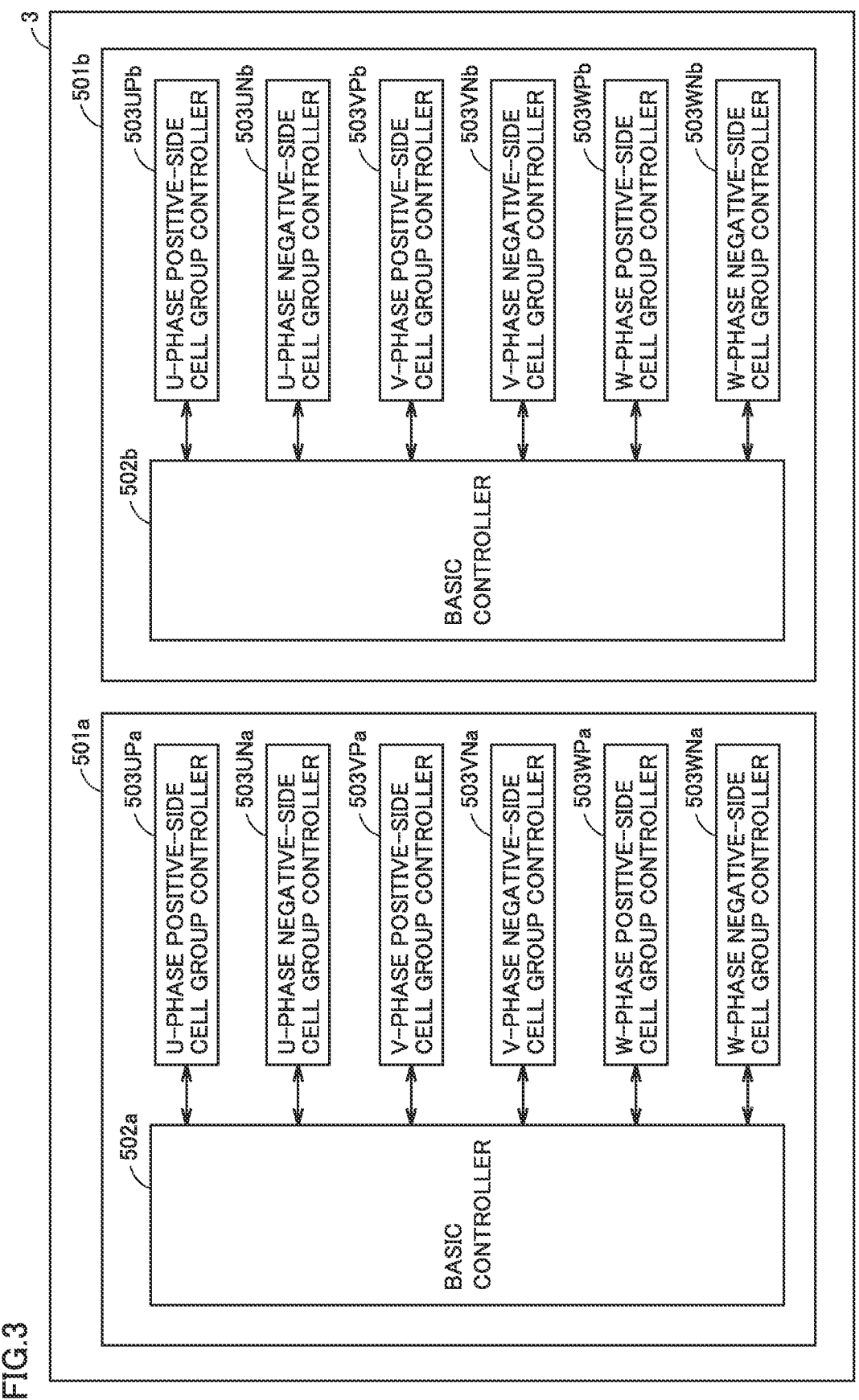
FIG. 3 is a view illustrating an internal configuration of a control device.

FIG. 3 is a view illustrating an internal configuration of control device 3. With reference to FIG. 3, control device 3 includes switching controllers 501a, 501b (hereinafter, also collectively referred to as a "switching controller 501"). Switching controller 501a controls on and off of each switching element 31 of converter cell 7a. Switching controller 501b controls on and off of each switching element 31 of converter cell 7b.

Switching controller 501a includes a basic controller 502a, a U-phase positive-side cell group controller 503UPa, a U-phase negative-side cell group controller 503UNa, a V-phase positive-side cell group controller 503VPa, a V-phase negative-side cell group controller 503VNa, a W-phase positive-side cell group controller 503WPa, and a W-phase negative-side cell group controller 503WNa. Switching controller 501b includes a basic controller 502b, a U-phase positive-side cell group controller 503UPb, a U-phase negative-side cell group controller 503UNb, a V-phase positive-side cell group controller 503VPb, a V-phase negative-side cell group controller 503VNb, a W-phase positive-side cell group controller 503WPb, and a W-phase negative-side cell group controller 503WNb.

In the following description, U-phase positive-side cell group controller 503UPa, V-phase positive-side cell group controller 503VPa, and W-phase positive-side cell group controller 503WPa are also collectively referred to as a positive-side cell group controller 503Pa. U-phase negative-side cell group controller 503UNa, V-phase negative-side cell group controller 503VNa, and W-phase negative-side cell group controller 503WNa are also collectively referred to as a negative-side cell group controller 503Na. Positive-side cell group controller 503Pa and negative-side cell group controller 503Na are also collectively referred to as a cell group controller 503a. Positive-side cell group controller 503Pa controls the operation of cell group 51, and negative-side cell group controller 503Na controls the operation of cell group 61.

U-phase positive-side cell group controller 503UPb, V-phase positive-side cell group controller 503VPb, and W-phase positive-side cell group controller 503WPb are also collectively referred to as a positive-side cell group controller 503Pb. U-phase negative-side cell group controller 503UNb, V-phase negative-side cell group controller 503VNb, and W-phase negative-side cell group controller 503WNb are also collectively referred to as a negative-side cell group controller 503Nb. Positive-side cell group controller 503Pb and negative-side cell group controller 503Nb are also collectively referred to as a cell group controller 503b. Positive-side cell group controller 503Pb controls the operation of cell group 52, and negative-side cell group controller 503Nb controls the operation of cell group 62.

Furthermore, basic controller 502a and basic controller 502b are also collectively referred to as a basic controller 502, and cell group controller 503a and cell group controller 503b are also collectively referred to as a cell group controller 503.

Figure 4:
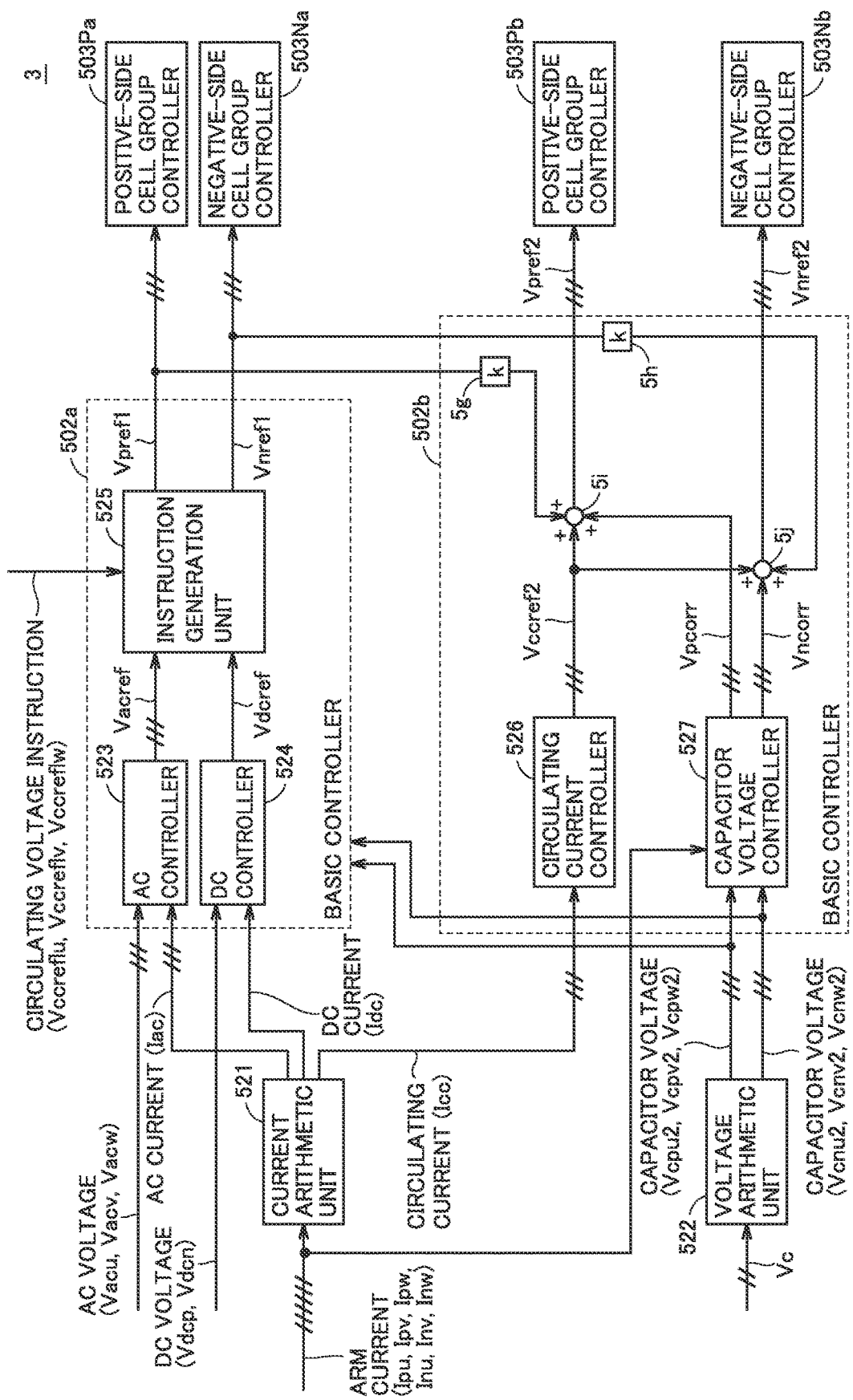
FIG. 4 is a view illustrating a configuration of a basic controller according to a first embodiment.

FIG. 4 is a view illustrating a configuration of basic controller 502 according to a first embodiment. With reference to FIG. 4, control device 3 includes basic controllers 502a, 502b, a current arithmetic unit 521, a voltage arithmetic unit 522, positive-side cell group controllers 503Pa, 503Pb, and negative-side cell group controllers 503Na, 503Nb. Basic controller 502a includes an AC controller 523, a DC controller 524, and an instruction generation unit 525. Basic controller 502b includes a circulating current controller 526, a capacitor voltage controller 527, adders 5i, 5j, and gain circuits 5g, 5h.

Basic controller 502a supplies voltage instruction values Vpref1, Vnref1 to positive-side cell group controller 503Pa and negative-side cell group controller 503Na, respectively. Basic controller 502b supplies voltage instruction values Vpref2, Vnref2 to positive-side cell group controller 503Pb and negative-side cell group controller 503Nb, respectively.

Voltage instruction values Vpref1, Vnref1 supplied to positive-side cell group controller 503Pa and negative-side cell group controller 503Na for controlling AC-DC conversion are not based on a detection value of a circulating current Icc. Voltage instruction values Vpref2, Vnref2 supplied to the positive-side cell group controller 503Pb and negative-side cell group controller 503Nb for controlling the circulating current are based on the detection value of circulating current Icc. From this, it can be said that converter cells 7a of cell groups 51, 61 are controlled not based on the circulating current, and converter cells 7b of cell groups 52, 62 are controlled based on the circulating current.

Current arithmetic unit 521 takes in the positive-side arm currents Ipu, Ipv, Ipw detected by arm current detector 9A and the negative-side arm currents Inu, Inv, Inw detected by arm current detector 9B. Current arithmetic unit 521 operates AC currents Iacu, Iacv, Iacw (hereinafter, also collectively referred to as an "AC current Iac"), a DC current Idc, and circulating currents Iccu, Iccv, Iccw (hereinafter, also collectively referred to as a "circulating current Icc") from the taken arm current. Current arithmetic unit 521 outputs each AC current Iac to AC controller 523, outputs DC current Idc to DC controller 524, and outputs circulating current Icc to circulating current controller 526.

U-phase AC current Iacu, V-phase AC current Iacv, and W-phase AC current Iacw are defined such that a current flowing from AC terminals Nu, Nv, Nw of each leg circuit 4 toward transformer 13 is set to positive. DC current Idc is defined such that a direction from DC circuit 14 toward positive-side DC terminal Np and a direction from negative-side DC terminal Nn toward DC circuit 14 are set to positive. Circulating currents Iccu, Iccv, Iccw flowing through leg circuits 4u, 4v, 4w are defined such that the direction from positive-side DC terminal Np toward negative-side DC terminal Nn is set to positive.

U-phase, V-phase, W-phase AC voltages Vacu, Vacv, Vacw (hereinafter, also collectively referred to as an "AC voltage Vac") detected by AC voltage detector 10 are further input to AC controller 523. AC controller 523 generates U-phase, V-phase, W-phase AC voltage instruction values Vacrefu, Vacrefv, Vacrefw (hereinafter, also collectively referred to as an "AC voltage instruction value Vacref") based on AC current Iac and AC voltage Vac.

DC voltages Vdcp, Vdcn detected by DC voltage detectors 11A, 11B are further input to DC controller 524. DC controller 524 generates a DC voltage instruction value Vdcref based on DC voltage (that is, the voltage between the DC terminals) Vdc and the DC current Idc of DC circuit 14 calculated from DC voltages Vdcp, Vdcn.

Instruction generation unit 525 generates voltage instruction values Vpref1, Vnref1 according to the presence or absence of a decrease in the capacitor voltage of cell groups 52, 62. First, the case where the capacitor voltages of cell groups 52, 62 are not lowered will be described. In this case, instruction generation unit 525 generates voltage instruction values Vpref1u, Vnref1u used for U-phase cell groups 51, 61 based on U-phase AC voltage instruction value Vacrefu and DC voltage instruction value Vdcref. Instruction generation unit 525 generates voltage instruction values Vpref1v, Vnref1v used for V-phase cell groups 51, 61 based on a V-phase AC voltage instruction value Vacrefv and DC voltage instruction value Vdcref. Instruction generation unit 525 generates voltage instruction values Vpref1w, Vnref1w used for W-phase cell groups 51, 61 based on a W-phase AC voltage instruction value Vacrefw and DC voltage instruction value Vdcref.

The case where the capacitor voltages of cell groups 52, 62 decrease will be described below. In this case, instruction generation unit 525 generates voltage instruction values Vpref1u, Vnref1u based on AC voltage instruction value Vacrefu, DC voltage instruction value Vdcref, and a U-phase circulating voltage instruction value Vccref1u. Instruction generation unit 525 generates voltage instruction values Vpref1v, Vnref1v based on AC voltage instruction value Vacrefv, DC voltage instruction value Vdcref, and a V-phase circulating voltage instruction value Vccref1v. Instruction generation unit 525 generates voltage instruction values Vpref1w, Vnref1w based on AC voltage instruction value Vacrefw, DC voltage instruction value Vdcref, and a circulating voltage instruction value Vccref1w.

Although details will be described later, in order to increase the arm current (more specifically, the current flowing through converter cell 7b) flowing through each leg circuit 4 during the decrease in the capacitor voltage, instruction generation unit 525 generates voltage instruction values Vpref1, Vnref1 based on circulating voltage instruction values Vccref1u, Vccref1v, Vccref1w (hereinafter, also collectively referred to as a "circulating voltage instruction value Vccref1"). Thus, the current flowing through converter cell 7b increases because the circulating current flowing between leg circuits 4 increases. Accordingly, charge of capacitor 32 of converter cell 7b is promoted, and the decrease in the capacitor voltage of cell groups 52, 62 is eliminated.

Voltage instruction values Vpref1u, Vpref1v, Vpref1w (also collectively referred to as a "voltage instruction value Vpref1") are supplied to positive-side cell group controller 503Pa. Voltage instruction values Vnref1u, Vnref1v, Vnref1w (also collectively referred to as a "voltage instruction value Vnref1") are supplied to negative-side cell group controller 503Na.

Voltage arithmetic unit 522 receives information about capacitor voltage Vc from each converter cell 7b provided in cell groups 52, 62 of each leg circuit 4. Voltage arithmetic unit 522 calculates a representative value Vcp2 of the plurality of capacitor voltages of cell group 52 and calculates a representative value Vcn2 of the plurality of capacitor voltages of cell group 62 for each phase based on the information about each capacitor voltage Vc. Representative values Vcp2 of the U phase, the V phase, and the W phase are described as Vcpu2, Vcpv2, and Vcpw2, respectively, and representative values Vcn2 of the U phase, the V phase, and the W phase are described as Vcnu2, Vcnv2, and Vcnw2, respectively.

An average value, a median value, a maximum value, a minimum value, or the like of capacitor voltage Vc of each cell group can be appropriately applied for the arithmetic operation of the representative value. Voltage arithmetic unit 522 outputs representative values Vcpu2, Vcpv2, Vcpw2 of the capacitor voltages of the respective cell groups 52 and representative values Vcnu2, Vcnv2, Vcnw2 of the capacitor voltages of the respective cell groups 62 to capacitor voltage controller 527.

Capacitor voltage controller 527 receives information about each arm current Iarm, and receives information about capacitor voltages Vcpu2, Vcpv2, Vcpw2, Vcnu2, Vcnv2, Vcnw2 from voltage arithmetic unit 522.

Capacitor voltage controller 527 generates a correction value Vpcorr in order to correct voltage instruction value Vpref2 for cell group 52 based on each arm current Iarm and capacitor voltages Vcpu2, Vcpv2, Vcpw2, and outputs generated correction value Vpcorr to adder 5i. Capacitor voltage controller 527 generates a correction value Vncorr in order to correct a voltage instruction value Vnref2 for cell group 62 based on each arm current Iarm and capacitor voltages Vcnu2, Vcnv2, Vcnw2, and outputs generated correction value Vncorr to adder 5j.

Circulating current controller 526 generates circulating voltage instruction values Vccref2u, Vccref2v, Vccref2w (hereinafter, also collectively referred to as a "circulating voltage instruction value Vccref2") for controlling the circulating current of each phase based on circulating currents Iccu, Iccv, Iccw.

Adder 5i adds circulating voltage instruction value Vccref2, a value obtained by multiplying voltage instruction value Vpref1 for cell group 51 by a gain k in gain circuit 5g, and correction value Vpcorr for each phase to generate voltage instruction value Vpref2 for cell group 52. Voltage instruction value Vpref2 is supplied to positive-side cell group controller 503Pb. Adder 5j adds circulating voltage instruction value Vccref2, a value obtained by multiplying voltage instruction value Vnref1 for cell group 61 by gain k in gain circuit 5h, and correction value Vncorr for each phase to generate voltage instruction value Vnref2 for cell group 62. Voltage instruction value Vnref2 is supplied to negative-side cell group controller 503Nb.

As described above, when the capacitor voltage of converter cell 7b does not decrease, basic controller 502a generates voltage instruction values Vpref1, Vnref1 in order to control the output voltages of the plurality of converter cells 7a for each leg circuit 4 based on DC current Idc and DC voltage Vdc of DC circuit 14 and AC current Iac and AC voltage Vac of each phase of AC circuit 12. On the other hand, when the capacitor voltage of converter cell 7b decreases, basic controller 502a generates voltage instruction values Vpref1, Vnref1 for each leg circuit 4 based on DC current Idc and DC voltage Vdc, AC current Iac and AC voltage Vac of each phase, and circulating voltage instruction value Vccref1.

Basic controller 502b linearly combines circulating voltage instruction value Vccref2, voltage instruction values Vpref1, Vnref1, and correction values Vpcorr, Vncorr to generate voltage instruction values Vpref2, Vnref2 for controlling the output voltages of the plurality of converter cells 7b.

<Detailed Operation of Control Device 3>
(Operation of Current Arithmetic Unit)

With reference to FIG. 1, the connection point between positive-side arm 5 and negative-side arm 6 of U-phase leg circuit 4u is AC terminal Nu, and AC terminal Nu is connected to transformer 13. Accordingly, AC current Iacu flowing from AC terminal Nu toward transformer 13 is a current value obtained by subtracting negative-side arm current Inu from positive-side arm current Ipu as in the following Equation (1).

$$Iacu = Ipu - Inu \tag{1}$$

Assuming that the average value of positive-side arm current Ipu and negative-side arm current Inu is a common current flowing through positive-side arm 5 and negative-side arm 6, this current is a leg current Icomu flowing through the DC terminal of leg circuit 4u. Leg current Icomu is expressed by the following Equation (2).

$$Icomu = (Ipu + Inu)/2 \tag{2}$$

Also in the V phase, AC current Iacv and a leg current Icomv are calculated using positive-side arm current Ipv and negative-side arm current Inv, and also in the W phase, AC current Iacw and a leg current Icomw are calculated using positive-side arm current Ipw and negative-side arm current Inw. Specifically, they are represented by the following Equations (3) to (6).

$$Iacv = Ipv - Inv \tag{3}$$

$$Icomv = (Ipv + Inv)/2 \tag{4}$$

$$Iacw = Ipw - Inw \tag{5}$$

$$Icomw = (Ipw + Inw)/2 \tag{6}$$

The positive-side DC terminals of leg circuits 4u, 4v, 4w of the respective phases are commonly connected as positive-side DC terminal Np, and the negative-side DC terminals are commonly connected as negative-side DC terminal Nn. From this configuration, the current value obtained by adding leg currents Icomu, Icomv, Icomw of the respective phases becomes DC current Idc that flows in from the positive-side terminal of DC circuit 14 and feeds back to DC circuit 14 through the negative-side terminal. Accordingly, DC current Idc is expressed as the following Equation (7).

$$Idc = Icomu + Icomv + Icomw \tag{7}$$

When the DC current components included in the leg current are equally shared by the respective phases, the current capacity of the converter cell can be equalized. With this taken into consideration, the difference between the leg current and ⅓ of the DC current value can be operated as the current value of the circulating current that does not flow through DC circuit 14 but flows between the legs of each phase. Consequently, circulation currents Iccu, Iccv, Iccw of the U phase, the V phase, and the W phase are expressed as the following Equations (8), (9), (10).

$$Iccu = Icomu - Idc/3 \tag{8}$$

$$Iccv = Icomv - Idc/3 \tag{9}$$

$$Iccw = Icomw - Idc/3 \tag{10}$$

Current arithmetic unit 521 in FIG. 4 operates AC currents Iacu, Iacv, Iacw, the DC current Idc, and the circulation currents Iccu, Iccv, Iccw from positive-side arm currents Ipu, Ipv, Ipw and negative-side arm currents Inu, Inv, Inw according to the above equation.

(Operation of AC Controller 523)

From AC voltages Vacu, Vacv, Vacw detected by AC voltage detector 10 and AC currents Iacu, Iacv, Iacw output from current arithmetic unit 521, AC controller 523 outputs the AC voltages to be output from converter cells 7 constituting power conversion device 1 as AC voltage instruction values Vacrefu, Vacrefv, Vacrefw.

For example, AC controller 523 is configured of an AC current controller that performs feedback control such that the AC current value is matched with the AC current instruction value, an AC voltage controller that performs feedback control such that the AC voltage value is matched with the AC voltage instruction value, and the like according to a function required for power conversion device 1. Alternatively, AC controller 523 may be configured of a power controller that obtains power from the AC current value and the AC voltage value and performs feedback control such that the power value becomes a desired value. In practice, one or a plurality of the AC current controllers, the AC voltage controllers, and the power controllers are combined to configure and operate AC controller 523.

Because the AC current controller described above controls the current output to AC circuit 12 through transformer 13, the voltage component controlling the current is a positive phase component and a reversed phase component of the multi-phase AC voltage or a component known as a normal mode component. Similarly, the AC voltage controller outputs the positive phase component and the reversed phase component to AC circuit 12 through transformer 13.

When the three-phase AC voltage is output to AC circuit 12, it is also conceivable to output a voltage component common to the three phases, which are known as a zero-phase component or a common mode component, to AC circuit 12 in addition to these positive and negative phase components. For example, when a third harmonic wave having a frequency three times the fundamental wave frequency is superimposed on the zero-phase component, it is known that the fundamental wave AC component that can be output by converter cell 7 can be increased by about 15%.

Furthermore, by outputting a constant zero-phase component, the following effects can be obtained. In power conversion device 1 having the configuration in FIG. 1, the AC voltage component output from cell group 51 and the AC voltage component output from cell group 61 have opposite polarities, and the DC voltage component output from cell group 51 and the DC voltage component output from cell group 61 have the same polarity. Accordingly, when a certain zero-phase component is included in the AC voltage component, the zero-phase component is superimposed on the DC voltage component output from cell group 51 and the DC voltage component output from cell group 61 in the positive and negative opposite directions. As a result, because the difference is generated between the DC power output from cell group 51 and the DC power output from cell group 61, the energy accumulated in capacitor 32 included in each converter cell 7 can be exchanged between cell group 51 and cell group 61. Thus, the voltage value of capacitor 32 of each converter cell 7 constituting cell group 51 and the voltage value of capacitor 32 of converter cell 7 constituting cell group 61 can be balanced, and the zero-phase voltage can be used for such balance control.

(Operation of DC Controller 524)

DC controller 524 operates a DC inter-terminal voltage Vdc from the difference voltage between DC voltages Vdcp, Vdcn detected by DC voltage detectors 11A, 11B, and is expressed as the following Equation (11).

$$Vdc = Vdcp - Vdcn \tag{11}$$

DC controller 524 generates and outputs the DC voltage that should be output by converter cell 7 as DC voltage instruction value Vdcref from DC inter-terminal voltage Vdc and DC current Idc.

For example, DC controller 524 is configured by combining any one or a plurality of the DC current controllers that control the DC current, the DC voltage controllers that control the DC voltage, and the DC power controllers that control the DC power. The DC voltage component output from cell group 51 and the DC voltage component output from cell group 61 have the same polarity according to DC voltage instruction value Vdcref output from the DC voltage controller, the DC current controller, and the DC power controller. Because cell groups 51, 61 are connected in series, the output voltages of cell groups 51, 61 are combined, and the combined voltage becomes a voltage component generated between the positive-side DC terminal and the negative-side DC terminal of leg circuit 4. DC voltage instruction value Vdcref is given to positive-side cell group controller 503Pa and negative-side cell group controller 503Na as components common to the respective phases. Consequently, according to DC voltage instruction value Vdcref, the voltage components output from cell groups 51, 61 become DC voltage components output to DC circuit 14.

(Operation of Instruction Generation Unit 525)

Instruction generation unit 525 operates the voltage to be output from cell group 51 as voltage instruction value Vpref1, and operates the voltage to be output from cell group 61 as voltage instruction value Vnref1. Each of voltage instruction values Vpref1, Vnref1 is obtained by combining DC voltage instruction value Vdcref and AC voltage instruction value Vacref for each phase.

Specifically, cell group 51 and cell group 61 are connected in series between positive-side DC terminal Np and negative-side DC terminal Nn that are connected to DC circuit 14. Accordingly, when each of voltage instruction value Vpref1 of cell group 51 and voltage instruction value Vnref1 of cell group 61 is calculated, ½ of DC voltage instruction value Vdcref is added and combined. On the other hand, because each of AC terminals Nu, Nv, Nw are located at the connection point between positive-side arm 5 and the negative-side arm 6, AC voltage instruction value Vacref is subtracted and combined when voltage instruction value Vpref1 of cell group 51 is calculated, and AC voltage instruction value Vacref is added and combined when voltage instruction value Vnref1 of cell group 61 is calculated. Specifically, in a normal state in which the capacitor voltage does not decrease, voltage instruction values Vpref1$u$, Vpref1$v$, Vpref1$w$, Vnref1$u$, Vnref1$v$, Vnref1$w$ are expressed as the following Equations (12) to (17).

$$Vpref1u = Vdcref/2 - Vacrefu \tag{12}$$

$$Vpref1v = Vdcref/2 - Vacrefv \tag{13}$$

$$Vpref1w = Vdcref/2 - Vacrefw \tag{14}$$

$$Vnref1u = Vdcref/2 + Vacrefu \tag{15}$$

$$Vnref1v = Vdcref/2 + Vacrefv \tag{16}$$

$$Vnref1w = Vdcref/2 + Vacrefw \tag{17}$$

Further, a zero-phase potential Vn is expressed by the following Equation (18).

$$Vn = Vacrefu + Vacrefv + Vacrefw \quad (18)$$

On the other hand, during the decrease in the capacitor voltage, circulating voltage instruction value Vccref is added and combined when voltage instruction values Vpref1, Vnref1 are calculated. Accordingly, voltage instruction values Vpref1$u$, Vpref1$v$, Vpref1$w$, Vnref1$u$, Vnref1$v$, Vnref1$w$ are expressed as the following Equations (19) to (24). The following Equation (25) holds for the circulating voltage instruction value.

$$Vpref1u = Vdcref/2 - Vacrefu + Vccref1u \quad (19)$$

$$Vpref1v = Vdcref/2 - Vacrefv + Vccref1v \quad (20)$$

$$Vpref1w = Vdcref/2 - Vacrefw + Vccref1w \quad (21)$$

$$Vnref1u = Vdcref/2 + Vacrefu + Vccref1u \quad (22)$$

$$Vnref1v = Vdcref/2 + Vacrefv + Vccref1v \quad (23)$$

$$Vnref1w = Vdcref/2 + Vacrefw + Vccref1w \quad (24)$$

$$Vccref1u + Vccref1v + Vccref1w = 0 \quad (25)$$

From these equations, it is understood that circulating voltage instruction value Vccref1 does not contribute to fluctuation of AC voltage Vac and DC voltage Vdc.

For example, in leg circuit 4$u$ of FIG. 1, when cell group 51 outputs the AC voltage having a relatively small value and when cell group 61 outputs the AC voltage having a relatively large value, the potential of AC terminal Nu approaches the potential of positive DC terminal Np, and a high voltage is output to AC terminal Nu. Specifically, cell group 61 outputs the AC voltage having the same polarity as the AC voltage to be output from AC terminal Nu, and cell group 51 outputs the AC voltage having the opposite polarity to the AC voltage to be output from AC terminal Nu.

(Operation of Circulating Current Controller 526)

U-phase, V-phase, W-phase circulating currents Iccu, Iccv, Iccw operated by current arithmetic unit 521 are sent to circulating current controller 526. Circulating current controller 526 performs feedback control such that the circulating current value is matched with the circulating current instruction value. That is, a compensator that amplifies a deviation between the circulating current instruction value and the circulating current value is provided in circulating current controller 526. At this point, a zero current is usually given as the circulating current instruction value, but a non-zero value may be given when imbalance is generated in the power system. Circulating current controller 526 outputs voltage components to be output by cell groups 52, 62 for the circulating current control as circulating voltage instruction value Vccref2.

Specifically, circulating current controller 526 generates circulating voltage instruction value Vccref2$u$ for the U-phase that compensates for (that is, the deviation is set to zero) the deviation between circulating current Iccu and circulating current instruction value Iccrefu. Similarly, circulating current controller 526 generates circulating voltage instruction value Vccref2$v$ for the V-phase that compensates for the deviation between circulating current Iccv and circulating current instruction value Iccrefv, and generates circulating voltage instruction value Vccref2$w$ for the W-phase that compensates for the deviation between circulating current Iccw and circulating current instruction value Iccrefw. Circulating voltage instruction values Vccref2$u$, Vccref2$u$, Vccref2$w$ are also collectively referred to as a circulating voltage instruction value Vccref2.

The circulating current is a current flowing between legs of different phases. Cell groups 51, 61 and reactors 8A, 8B exist in a current path of the circulating current, and the circulating current is generated by applying the potential difference generated by switching of cell groups 51, 61 to reactors 8A, 8B. Accordingly, when voltages of opposite polarities are applied to the reactor by cell groups 52, 62 provided in the same path, the circulating current is prevented.

For example, in the case where circulating current Iccu flows from the positive-side DC terminal to the negative-side DC terminal of leg circuit 4$u$, the voltage in the direction in which the circulating current is decreased is applied to the reactors 8A, 8B when the positive voltage is output in each of cell groups 52, 62 of leg circuit 4$u$. When the current flows in the reverse direction of the above, the circulating current is attenuated when the voltages at cell groups 52, 62 are also applied in the reverse direction. Circulating current controller 526 executes feedback control such that the circulating current instruction value and the circulating current value are matched with each other.

(Operation of Capacitor Voltage Controller 527)

The voltage at capacitor 32 of each converter cell 7$b$ constituting each of cell groups 52, 62 is detected by voltage detector 33. Voltage arithmetic unit 522 operates capacitor voltages Vcpu2, Vcpv2, Vcpw2 of converter cells 7$b$ of cell group 52 and capacitor voltages Vcnu2, Vcnv2, Vcnw2 (simply referred to as "capacitor voltage") of converter cells 7$b$ of cell group 62.

The compensator provided in capacitor voltage controller 527 performs control operation such that the capacitor voltages at cell groups 52, 62 of the respective phases follow the capacitor voltage instruction value. Capacitor voltage controller 527 outputs a result obtained by multiplying the control arithmetic result by the polarity (for example, 1 or −1) of arm current Iarm to adders 5$i$, 5$j$ as the correction value for the circulating current control.

Specifically, capacitor voltage controller 527 performs the control operation such that capacitor voltages Vcpu2, Vcpv2, Vcpw2 follow the capacitor voltage instruction value, and multiplies the control arithmetic result by the polarities of the positive arm currents Ipu, Ipv, Ipw to generate correction values Vpcorru, Vpcorrv, Vpcorrw (hereinafter, also collectively referred to as a "correction value Vpcorr") for the U-phase, the V-phase, and the W-phase. In addition, capacitor voltage controller 527 performs the control operation such that capacitor voltages Vcnu2, Vcnv2, Vcnw2 follow the capacitor voltage instruction value, and multiplies the control arithmetic result by the polarities of negative arm currents Inu, Inv, Inw to generate correction values Vncorru, Vncorrv, Vncorrw (hereinafter, also collectively referred to as a "correction values Vncorr") for the U-phase, the V-phase, and the W-phase.

(Operation of Adders 5$i$, 5$j$)

Adder 5$i$ adds circulating voltage instruction value Vccref2, a value proportional to voltage instruction value Vpref1 for cell group 51, and correction value Vpcorr for each phase. The addition result of adder 5$i$ is input to positive-side cell group controller 503Pb as a voltage instruction value Vpref2 (for U-phase: Vpref2$u$, for V-phase: Vpref2$v$, for W-phase: Vpref2$w$) representing the voltage component to be output from cell group 52. Adder 5$j$ adds circulating voltage instruction value Vccref2, a value proportional to voltage instruction value Vnref1 for cell group 61, and correction value Vncorr for each phase. The addition result of adder 5$j$ is input to negative-side cell group controller 503Nb as a voltage instruction value Vnref2 (for U phase: Vnref2u, for V phase: Vnref2v, for W phase: Vnref2w) representing the voltage component to be output from cell group 62.

The reason why the proportional values of the voltage instruction values are added in adders 5i, 5j is that the half bridge type in FIG. 2(a) is used for converter cells 7b constituting cell groups 52, 62 for the circulating current control. Because the half-bridge type converter cell can output only the zero voltage or the positive voltage, in order to increase or decrease the output voltage of converter cell 7 according to the increase or decrease in the circulating current, the output voltage is required to increase or decrease based on a certain voltage value. However, when the voltage serving as the reference is fixed to a constant value, undesirably capacitor 32 continues to be charged by DC current Idc flowing between DC circuit 14 and leg circuit 4. In order to avoid this problem, k times of voltage instruction values Vpref1, Vnref1n for cell groups 51, 61 are added to voltage instruction values Vpref2, Vnref2 for cell groups 52, 62 as the reference voltages.

Thus, under the current conditions corresponding to the voltage instruction values Vpref1, Vnref1, the deviation between the AC power and the DC power generated in converter cells 7b constituting cell groups 52, 62 can be reduced (that is, the active power flowing into or out of converter cell 7b approaches zero), so that the voltage fluctuation of capacitors 32 of converter cells 7b can be prevented. Gain k is set to an arbitrary value such that the output voltage of converter cell 7b is not saturated when circulating voltage instruction value Vccref2 for the circulating current control is given.

When converter cell 7b of cell groups 52, 62 for the circulating current control is configured of converter cell 7 having the full-bridge configuration in FIG. 2(b), converter cell 7b can output the voltage at both poles, so that gain k can also be set to zero.

Furthermore, the reason why the correction value is added in adders 5i, 5j will be described. Because the voltages output from cell groups 52, 62 for the circulating current control have a function of controlling the currents flowing through reactors 8A, 8B, the output power of cell groups 52, 62 becomes substantially reactive power. However, when the active power due to the loss exists in reactors 8A, 8B cannot be ignored, the active power is required to be supplied to cell groups 52, 62. This is because the voltages at capacitors 32 of cell groups 52, 62 cannot be maintained only by providing proportional values of voltage instruction values Vpref1, Vnref1 to the cell groups 52, 62.

According to the above configuration, (i) when arm current Iarm is positive (polarity=1) and when the capacitor voltage is smaller than the instruction value, the compensator outputs the positive signal. Accordingly, by multiplying the output of the compensator by the polarity (=1) of arm current Iarm, the correction value for the circulating current control becomes the signal having the positive component. The signal of the correction value lengthens the period during which switching element 31p is conductive, so that the period during which arm current Iarm flows into capacitor 32 increases. As a result, the deviation between the capacitor voltage instruction value and the detection value of the capacitor voltage is eliminated because capacitor 32 is charged.

(ii) When arm current Iarm is positive (polarity=1) and when the capacitor voltage is larger than the instruction value, the compensator outputs the negative signal. Accordingly, by multiplying the output of the compensator by the polarity (=1) of arm current Iarm, the correction value for the circulating current control becomes the signal having the negative component. The signal of the correction value shortens the period during which switching element 31p is conductive, so that the deviation between the capacitor voltage instruction value and the detection value of the capacitor voltage is eliminated.

(iii) When arm current Iarm is negative (polarity=−1) and when the capacitor voltage is smaller than the instruction value, the compensator outputs the positive signal. Accordingly, by multiplying the output of the compensator by the polarity (=−1) of arm current Iarm, the correction value for the circulating current control becomes the signal having the negative component. The signal of the correction value shortens the period during which switching element 31p is conductive, so that the period during which arm current Iarm flows out of capacitor 32 decreases. As a result, the deviation between the capacitor voltage instruction value and the detection value of the capacitor voltage is eliminated because the discharge time of capacitor 32 decreases.

(iv) When arm current Iarm is negative (polarity=−1) and when the capacitor voltage is larger than the instruction value, the compensator outputs the negative signal. Accordingly, by multiplying the output of the compensator by the polarity (=−1) of arm current Iarm, the correction value for the circulating current control becomes the signal having the positive component. The discharge time of capacitor 32 increases because the signal of the correction value lengthens the period during which switching element 31p is conductive, so that the deviation between the capacitor voltage instruction value and the detection value of the capacitor voltage is eliminated.

(Configuration and Operation of Cell Group Controller 503)

Figure 5:
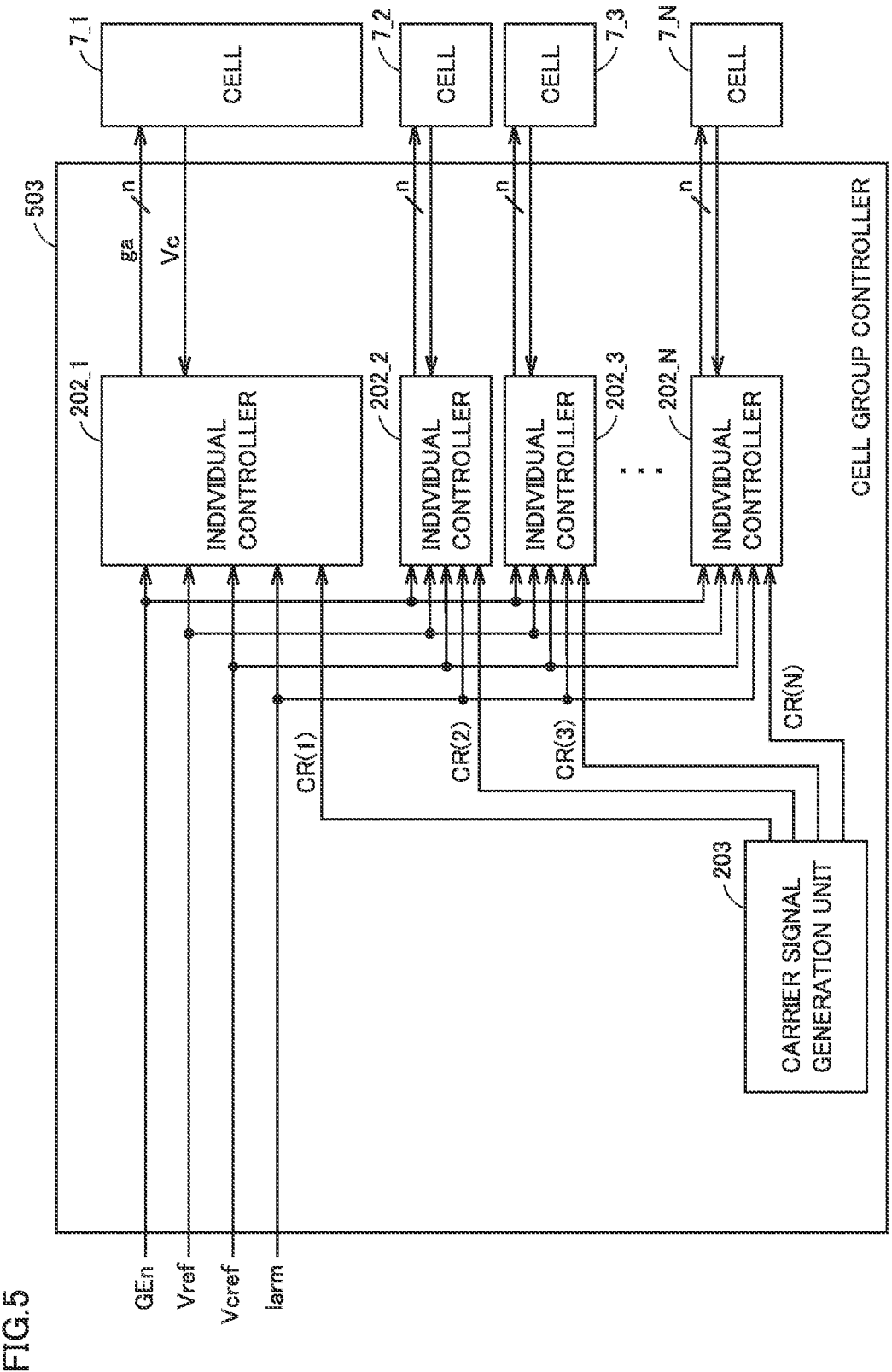
FIG. 5 is a view illustrating a configuration of a cell group controller.

FIG. 5 is a view illustrating a configuration of cell group controller 503. With reference to FIG. 5, cell group controller 503 includes N individual controllers 202_1 to 202_N (hereinafter, also collectively referred to as an "individual controllers 202"). For example, N1 converter cells 7a are included in cell groups 51, 61. Accordingly, each of positive-side cell group controller 503Pa and negative-side cell group controller 503Na corresponding to cell groups 51, 61 includes N1 individual controllers 202. Hereinafter, for the sake of description, voltage instruction values Vpref1, Vnref1, Vpref2, Vnref2 will be collectively referred to as a voltage instruction value Vref.

Individual controller 202_i individually controls corresponding converter cells 7. Individual controller 202_i receives voltage instruction value Vref, arm current Iarm, capacitor voltage instruction value Vcref, and a switching permission signal GEn from basic controller 502. Capacitor voltage instruction value Vcref and switching permission signal GEn are generated by basic controller 502. For example, capacitor voltage instruction value Vcref is a rated value of capacitors 32 of the plurality of converter cells 7 included in each cell group. Individual controller 202_i receives capacitor voltage Vc from corresponding converter cell 7_i. Individual controller 202_i transmits capacitor voltage Vc to basic controller 502.

When switching permission signal GEn is "1", each switching element 31 of converter cell 7 can perform on and off switching operation by gate signal ga. In this case, converter cell 7 is in a deblock state.

When switching permission signal GEn is "0", all switching elements 31 of converter cell 7 are turned off by gate signal ga. In this case, converter cell 7 is in a gate block state.

For example, when an accident is generated in the power system or when transient operation is difficult, basic controller 502 generates switching permission signal GEn having the value of "0" and outputs switching permission signal GEn to individual controller 202.

Carrier signal generation unit 203 sets a reference phase of the carrier signal for each converter cell 7, and generates the carrier signal having the set reference phase. Specifically, carrier signal generation unit 203 sets an interval between the reference phases (hereinafter, also referred to as a "carrier reference phase") of the plurality of carrier signals CR(i) to an interval obtained by dividing 360 degrees by the number N of the plurality of converter cells 7_i. The reference phase of carrier signal CR(i) represents a difference between the phase of carrier signal CR(i) and a reference phase. The phase of a carrier signal CR (0) can be used as the reference phase. Carrier signal generation unit 203 generates carrier signals CR (1) to CR (N) having the set carrier reference phase.

Individual controller 202_i receives a carrier signal CRi from carrier signal generation unit 203. Individual controller 202_i performs pulse width modulation (PWM) control on converter cell 7_i using carrier signal CRi. Specifically, when switching enabling signal GEn is "1" (that is, the converter cell 7_i is in the deblock state), individual controller 202_i modulates voltage instruction value Vref and carrier signal CRi of converter cell 7_i by the phase shift PWM method, thereby generating gate signal ga (for example, a PWM modulation signal) and outputting gate signal ga to converter cell 7_i. Individual controller 202_i performs modulation according to the configuration of converter cell 7_i. In the configuration of converter cell 7_i, the number n of PWM modulation signals to be output also increases or decreases. For example, n=2 for the converter cell in the half-bridge configuration, and n=4 for the converter cell in the full-bridge configuration.

<Voltage Instruction Value Given to Cell Groups 51, 61 when Capacitor Voltage Decreases>

In the above description, the capacitor voltage is maintained by the correction value output from capacitor voltage controller 527. However, when the magnitude (for example, the effective value) of arm current Iarm is small and when the active power and the reactive power output from power conversion device 1 are small, converter cells 7b of cell groups 52, 62 that do not perform the AC-DC conversion control cannot sufficiently charge capacitor 32 even with the correction value by capacitor voltage controller 527. In this case, the voltage at capacitor 32 of converter cell 7b cannot be maintained but decreases.

Accordingly, when the voltage at capacitor 32 in converter cell 7b decreases, control device 3 executes control processing for increasing the current flowing through converter cell 7b in order to charge capacitor 32. Specifically, control device 3 of the first embodiment executes processing for controlling cell groups 51, 61 as the control processing such that the circulating voltage for increasing the circulating current is output from cell groups 51, 61. When the voltages at capacitors 32 in all converter cells 7b are returned, control device 3 stops the control processing.

Specifically, basic controller 502a in FIG. 4 receives capacitor voltages Vcpu2, Vcpv2, Vcpw2 at cell group 52 of each phase and the capacitor voltages Vcnu2, Vcnv2, Vcnw2 at cell group 62 of each phase. Subsequently, instruction generation unit 525 of basic controller 502a determines whether at least one of capacitor voltages Vcpu2, Vcpv2, Vcpw2, Vcnu2, Vcnv2, Vcnw2 is less than a threshold Th1.

For example, threshold Th1 is set to about 90% of the rated value of the capacitor voltage.

When at least one capacitor voltage is less than threshold Th1, instruction generation unit 525 determines that the capacitor voltage decreases, and generates voltage instruction values Vpref1, Vnref1 based on DC voltage instruction value Vdcref, AC voltage instruction value Vacref, and circulating voltage instruction value Vccref1. Thus, because voltage instruction values Vpref1, Vnref1 are supplied to the cell groups 51, 61 in order to output the circulating voltage as disturbance, the circulating current is generated, and as a result, the arm current flowing through each leg circuit 4 increases (that is, the effective value of the arm current increases).

At this point, because the circulating current is the current that does not include AC circuit 12 and DC circuit 14 in the path, the influence on AC circuit 12 and DC circuit 14 is prevented even when the circulating current flows. However, when the circulating current including the DC component flows, the component related to the DC current output cannot be ignored, so that the average value of each phase of the capacitor voltages of cell groups 51, 61 varies. When the circulating current including a fundamental frequency component of AC circuit 12 flows, the component related to the AC current output cannot be ignored, so that the average value of the capacitor voltage of cell group 51 and the average value of the capacitor voltage of cell group 61 vary.

Accordingly, the circulating current to be generated is desirably the current including the fundamental frequency component of AC circuit 12 and a frequency component other than the DC component. Therefore, the circulating voltages output from cell groups 51, 61 are set so as not to include the fundamental frequency component and the frequency component of the DC component. Specifically, circulating voltage instruction values Vccref1 to cell groups 51, 61 are set so as not to include the fundamental frequency component and the frequency component of the DC component.

As described above, when the voltage instruction value to which circulating voltage instruction value Vccref1 is added is given to cell groups 51, 61, the arm current increases, so that the charge of capacitor 32 of converter cell 7b is promoted. The circulating current is controlled by cell groups 52, 62 so as to follow the circulating current instruction value. Accordingly, even when circulating voltage instruction value Vccref1 is added to the voltage instruction values for cell groups 51, 61, the circulating current flowing through each leg circuit 4 is not maintained while greatly varying.

Thereafter, when the capacitor voltage at converter cell 7b is returned, instruction generation unit 525 generates voltage instruction values Vpref1, Vnref1 that do not add and combine circulating voltage instruction value Vccref1. Specifically, when all the capacitor voltages (that is, each of capacitor voltages Vcpu2, Vcpv2, Vcpw2, Vcnu2, Vcnv2, Vcnw2) become equal to or larger than a threshold Th2, instruction generation unit 525 generates voltage instruction values Vpref1, Vnref1 based on DC voltage instruction value Vdcref and AC voltage instruction value Vacref. In order to prevent chattering and the like, threshold Th2 is set to be larger than threshold Th1 and to be close to the rated value of the capacitor voltage (for example, 99% of the rated value).

Advantages

According to the first embodiment, in power conversion device 1 including the cell group for the AC-DC conversion control and the cell group for the circulating current control, the arm current can be increased by the output of the circulating voltage. Consequently, when the capacitor voltage at converter cell 7b decreases, the capacitor can be charged, and the voltage at the capacitor included in each cell group can be appropriately controlled.

Second Embodiment

The configuration, in which the arm current flowing through each leg circuit 4 is increased by generating voltage instruction values Vpref1, Vnref1 to which circulating voltage instruction value Vccref1 is added when the capacitor voltage at converter cell 7b decreases, has been described in the first embodiment. A configuration, in which the arm current is increased by generating voltage instruction values Vpref1, Vnref1 that increase the AC current or the DC current when the capacitor voltage at converter cell 7b decreases, will be described in a second embodiment.

Figure 6:
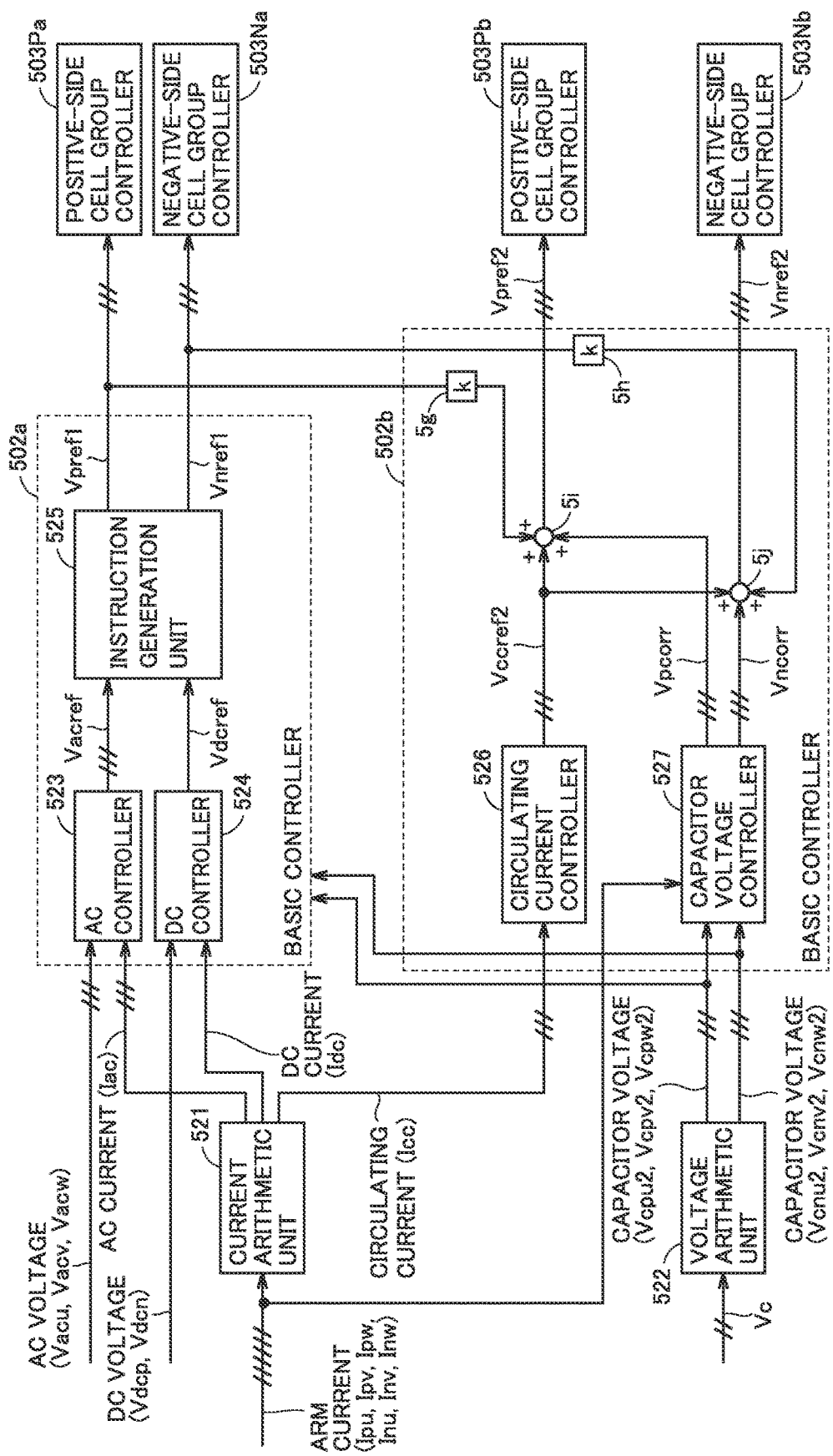
FIG. 6 is a view illustrating a configuration of a basic controller according to a second embodiment.

FIG. 6 is a view illustrating a configuration of basic controller 502 according to the second embodiment. Basic controller 502a in FIG. 6 is different from basic controller 502a in FIG. 4 in that circulating voltage instruction value Vccref1 is not input. The other configurations are the same. A method for determining the decrease in the capacitor voltage and a method for determining the return of the capacitor voltage are similar to the determination method described in the first embodiment.

(Increase in AC Current)

As the control processing for increasing the current flowing through converter cell 7b, control device 3 executes processing for controlling each converter cell 7a of cell groups 51, 61 so as to increase the amplitude value of the AC current output from power conversion circuit unit 2. With reference to FIG. 6, the details will be described below.

With reference to FIG. 6, when determining that the capacitor voltage at converter cell 7b decreases, AC controller 523 generates AC voltage instruction value Vacref in order to increase the amplitude value of the AC current output from power conversion circuit unit 2. In this case, instruction generation unit 525 generates voltage instruction values Vpref1, Vnref1 based on AC voltage instruction value Vacref, and cell groups 51, 61 are controlled by voltage instruction values Vpref1, Vnref1. Accordingly, the output AC current increases (that is, the arm current flowing through each leg circuit 4 increases), and capacitor 32 of converter cell 7b can be charged by the arm current.

At this point, when the AC current is output, at least one of the active power and the reactive power is transmitted and received between power conversion device 1 and AC circuit 12. First, the case of focusing on the active power will be described.

When AC circuit 12 is a three-phase AC system, generally, power for driving auxiliary machines including control device 3 and other devices (for example, a cooling device) is received from AC circuit 12. Accordingly, the AC power of AC circuit 12 is the total power of the active power output from power conversion device 1 to AC circuit 12 and the drive power for driving the auxiliary machine. When the distribution of the active power and the drive power is periodically changed while the total power is maintained, a time average value of the active power and the drive power can be maintained while the influence on AC circuit 12 is prevented. Furthermore, the active power output from power conversion device 1 is changed so as to increase the AC current output to AC circuit 12, so that the arm current flowing through each leg circuit 4 can be increased.

Specifically, AC controller 523 generates AC voltage instruction value Vacref for changing the active power so as to increase the amplitude value of the AC current output from power conversion circuit unit 2 while maintaining the total power. At this time, a ratio of the active power to the total power is periodically changed such that the time average value of the driving power of the auxiliary machine and the time average value of the active power do not change. Although the capacitor voltage at each converter cell 7a fluctuates with the change in the distribution of the driving power and the active power, this fluctuation is allowed because it is temporary when the capacitor voltage at converter cell 7b decreases.

Thereafter, when determining that the capacitor voltage at converter cell 7b is returned, AC controller 523 stops the processing for increasing the AC current, and generates AC voltage instruction value Vacref by normal feedback control.

As described above, while maintaining the total power of the drive power for driving the auxiliary machine and the active power output from power conversion circuit unit 2, control device 3 controls each converter cell 7a to change the active power so as to increase the amplitude value of the AC current.

The case of focusing on reactive power will be described below. When AC circuit 12 is an AC system, the output of the reactive power from power conversion device 1 to AC circuit 12 is assumed in order to stabilize the voltage at the AC system. At this time, in order to reduce device capacity (for example, the maximum value of the combined capacity of the available active power and the reactive power) of power conversion device 1, sometimes a reactive power compensation device such as a static var compensator (SVC) including a fast phase capacitor or a static synchronous compensator (STATCOM) is provided in parallel with power conversion device 1. For example, control device 3 is configured of being able to communicate with the reactive power compensation device, and transmits and receives various types of information.

For this reason, the reactive power supplied to AC circuit 12 is the total reactive power of reactive power Q1 output from power conversion device 1 to AC circuit 12 and reactive power Q2 output from the reactive power compensation device to AC circuit 12. The influence on AC circuit 12 can be suppressed by maintaining the total reactive power. Furthermore, by changing reactive power Q1 output from power conversion device 1, the arm current flowing through each leg circuit 4 can be increased so as to increase the AC current output to AC circuit 12.

Specifically, AC controller 523 generates AC voltage instruction value Vacref for changing reactive power Q1 such that the amplitude value of the AC current output from the power conversion circuit unit 2 increases while maintaining the total reactive power. The total reactive power is previously determined by a system operator. In addition, control device 3 (for example, AC controller 523) determines the distribution of reactive power Q1 and reactive power Q2 in cooperation with the reactive power compensation device.

Thereafter, when determining that the capacitor voltage at converter cell 7b is returned, AC controller 523 stops the processing for increasing the AC current, and generates AC voltage instruction value Vacref by normal feedback control.

As described above, control device 3 changes reactive power Q1 controlling each converter cell 7a such that the amplitude value of the AC current output to the AC circuit 12 increases while maintaining the total reactive power of reactive power Q1 output from power conversion circuit unit 2 and reactive power Q2 output from the reactive power compensation device.

(Increase in DC Current)

As the control processing for increasing the current flowing through converter cell 7b, control device 3 executes processing for controlling each converter cell 7a of cell groups 51, 61 so as to increase an absolute value of the DC current output from power conversion circuit unit 2. With reference to FIG. 6, the details will be described below.

Referring to FIG. 6, when determining that the capacitor voltage of converter cell 7b decreases, DC controller 524 generates DC voltage instruction value Vdcref in order to increase the absolute value of the DC current output from power conversion circuit unit 2. In this case, instruction generation unit 525 generates voltage instruction values Vpref1, Vnref1 based on DC voltage instruction value Vdcref, and cell groups 51, 61 are controlled by voltage instruction values Vpref1, Vnref1. Accordingly, the output DC current increases (that is, the arm current flowing through each leg circuit 4 increases), and capacitor 32 of converter cell 7b can be charged by the arm current.

However, in the case where the DC current is increased, when only the DC current flowing in one direction (for example, in the positive direction) is continuously increased, the capacitor voltage at each converter cell 7a fluctuates. Accordingly, it is desirable to periodically change the increase processing of the DC current flowing in the positive direction (that is, the direction from DC circuit 14 toward positive-side DC terminal Np) and the increase processing of the DC current flowing in the negative direction (that is, the direction from DC circuit 14 toward negative DC terminal Nn).

At this point, the DC power output from power conversion circuit unit 2 to DC circuit 14 when the DC current flows in the positive direction is denoted by Pdc1, and the DC power output from power conversion circuit unit 2 to DC circuit 14 when the DC current flows in the negative direction is denoted by Pdc2. In this case, the absolute value of the DC current is increased while the direction of the DC current is changed such that the difference between the time average value of DC power Pdc1 and the time average value of DC power Pdc2 becomes the desired DC power, so that the fluctuation of the capacitor voltage of each converter cell 7 can be prevented within a prescribed range to increase the arm current flowing to each leg circuit 4. The desired DC power may be a power value designated by the system operator or the instruction value that defines the DC power output from power conversion circuit unit 2 to DC circuit 14.

Specifically, DC controller 524 generates DC voltage instruction value Vdcref that changes the direction of the DC current output from power conversion circuit unit 2 and increases the absolute value of the DC current such that the difference between the time average value of DC power Pdc1 and the time average value of DC power Pdc2 becomes the desired DC power. Although the capacitor voltage at each converter cell 7a fluctuates with the change in the direction in which the DC current flows and the absolute value, this fluctuation is allowed because it is temporary when the capacitor voltage of converter cell 7b decreases.

Thereafter, when determining that the capacitor voltage at converter cell 7b is returned, DC controller 524 stops the processing for increasing the DC current, and generates DC voltage instruction value Vdcref by normal feedback control.

As described above, control device 3 increases the absolute value of the DC current while the direction of the DC current is changed such that the difference between the time average value of DC power Pdc1 and the time average value of DC power Pdc2 becomes the desired DC power by controlling each converter cell 7a.

Advantages

According to the second embodiment, the increase in the AC current or the DC current can increase the arm current, and promote the charge of the capacitor of converter cell 7b.

Third Embodiment

In a third embodiment, another configuration increasing the arm current when the capacitor voltage at converter cell 7b decreases will be described. In the third embodiment, transformer 13 in FIG. 1 is a transformer of a variable transformation ratio. For example, the transformer of the variable transformation ratio is implemented by a transformer with a tap switching function. Control device 3 is configured of being able to communicate with transformer 13, and transmits various instructions such as an instruction to change the transformation ratio to transformer 13.

Because power conversion device 1 is connected to AC circuit 12 through transformer 13, the AC output current can be changed without affecting the AC output power and the DC output power by changing the transformation ratio of transformer 13. Thus, the charge of capacitor 32 of converter cell 7b can be promoted because arm current Iarm can be increased.

When determining that the capacitor voltage at converter cell 7b decreases, control device 3 changes the transformation ratio of transformer 13 in order to increase arm current Iarm. Specifically, an amplitude value of the AC current output from power conversion device 1 is increased by decreasing the ratio (that is, V2/V1) between a voltage V1 on the side of AC circuit 12 of transformer 13 and a voltage V2 on the side of power conversion device 1. Thus, the current flowing through converter cell 7b also increases because arm current Iarm increases. As a result, the charge of capacitor 32 of converter cell 7b is promoted.

As described above, control device 3 changes the transformation ratio of transformer 13 provided between AC circuit 12 and power conversion circuit unit 2 so as to increase the amplitude value of the AC current output from power conversion circuit unit 2. Thereafter, when determining that the capacitor voltage at converter cell 7b is returned, control device 3 returns the transformation ratio of transformer 13 to the state before the change.

Advantages

According to the third embodiment, the transformer transformation ratio of the transformer is changed, so that the arm current can be increased to promote the charge of the capacitor of converter cell 7b.

OTHER EMBODIMENTS (1) In the above-described embodiments, in each of reactors 8A, 8B, only positive-side reactor 8A or only negative-side reactor 8B may be provided in each leg circuit 4. When only negative-side reactor 8B is provided, cell group 52 for the circulating current control becomes unnecessary, and positive-side cell group controller 503Pb, adder 5i, and gain circuit 5g related to cell group 52 are also unnecessary. Therefore, there is an advantage that the configuration of control device 3 can be simplified. Similarly, when only positive-side reactor 8A is provided, cell group 62 for the circulating current control becomes unnecessary, and negative-side cell group controller 503Nb, adder 5j, and gain circuit 5h related to cell group 62 are also unnecessary. Therefore, there is an advantage that the configuration of control device 3 can be simplified.

(2) In the above-described embodiments, converter cells 7a constituting cell groups 51, 61 not for the circulating current control and each converter cells 7b constituting cell groups 52, 62 for the circulating current control have the same configuration. Alternatively, converter cells 7a constituting cell groups 51, 61 and converter cells 7b constituting cell groups 52, 62 may have different configurations.

(3) An example in which capacitor voltage controller 527 multiplies the output of the compensator by the polarity of arm current Iarm has been described in the above-described embodiments. However, the similar effect can be obtained by multiplying the output of the compensator by the current value of arm current Iarm instead of the polarity of arm current Iarm.

(4) The configuration in which control device 3 determines that the capacitor voltage decreases when at least one of capacitor voltages Vcpu2, Vcpv2, Vcpw2, Vcnu2, Vcnv2, Vcnw2 is less than threshold Th1 has been described in the above-described embodiments. However, the configuration is not limited to the embodiments. For example, when the capacitor voltage of at least one converter cell 7b in all converter cells 7b included in each leg circuit 4 is less than threshold Th1, control device 3 may determine that the capacitor voltage decreases. In this case, when the capacitor voltages at all converter cells 7b included in each leg circuit 4 become equal to or greater than threshold Th2, control device 3 may determine that the capacitor voltage is returned.

(5) The configuration exemplified as the above-described disclosure is an example of the configuration of the present disclosure, and can be combined with another known technique, or can be modified, for example, partially omitted without departing from the gist of the present disclosure. In addition, in the above-described embodiments, the processing and configuration described in other embodiments may be appropriately adopted and implemented.

It should be considered that the disclosed embodiment is an example in all respects and not restrictive. The scope of the present disclosure is defined by not the description above, but the claims, and it is intended that all modifications within the meaning and scope of the claims and their equivalents are included in the present disclosure.

REFERENCE SIGNS LIST

1: power conversion device, 2: power conversion circuit unit, 3: control device, 4u, 4v, 4w: leg circuit, 5: positive-side arm, 5g, 5h: gain circuit, 5i, 5j: adder, 6: negative-side arm, 7a, 7b: converter cell, 8A, 8B: reactor, 9A, 9B: arm current detector, 10: AC voltage detector, 11A, 11B: DC voltage detector, 12: AC circuit, 13: transformer, 14: DC circuit, 16: AC current detector, 31n1, 31n2, 31n, 31p, 31p1, 31p2: switching element, 32: capacitor, 33: voltage detector, 34: bypass switch, 51, 52, 61, 62: cell group, 202: individual controller, 203: carrier signal generation unit, 501, 501a, 501b: switching controller, 502, 502a, 502b: basic controller, 503, 503a, 503b: cell group controller, 503Na, 503Nb: negative-side cell group controller, 503Pa, 503Pb: positive-side cell group controller, 521: current arithmetic unit, 522: voltage arithmetic unit, 523: AC controller, 524: DC controller, 525: instruction generation unit, 526: circulating current controller, 527: capacitor voltage controller

The invention claimed is:

1. A power conversion device that performs power conversion between a DC circuit and an AC circuit, the power conversion device comprising:
a power conversion circuit unit including a plurality of leg circuits corresponding to a plurality of phases of the AC circuit, each of the leg circuits including a plurality of first converter cells each having a capacitor and connected in series to each other and a plurality of second converter cells each having a capacitor and connected in series to each other; and
a control device to control operations of each of the first converter cells and each of the second converter cells,
wherein the plurality of first converter cells are controlled not based on a circulating current circulating between the plurality of leg circuits, and the plurality of second converter cells are controlled based on the circulating current,
wherein the control device executes control processing for increasing a current flowing through at least one of the plurality of second converter cells when a voltage at the capacitor in the at least one of the plurality of second converter cells becomes less than a first threshold, and
wherein the control device executes processing for controlling the plurality of first converter cells as the control processing such that a circulating voltage for increasing the circulating current is output from the plurality of first converter cells.

2. The power conversion device according to claim 1, wherein the circulating voltage does not include a fundamental frequency component and a DC component of the AC circuit.

3. The power conversion device according to claim 2, wherein the control device stops the control processing when voltages at all the capacitors in the plurality of second converter cells become equal to or greater than a second threshold value.

4. The power conversion device according to claim 1, wherein the control device stops the control processing when voltages at all the capacitors in the plurality of second converter cells become equal to or greater than a second threshold value.

5. The power conversion device according to claim 4, wherein the second threshold value is larger than the first threshold.

6. A power conversion device that performs power conversion between a DC circuit and an AC circuit, the power conversion device comprising:
a power conversion circuit unit including a plurality of leg circuits corresponding to a plurality of phases of the AC circuit, each of the leg circuits including a plurality of first converter cells each having a capacitor and connected in series to each other and a plurality of second converter cells each having a capacitor and connected in series to each other; and
a control device to control operations of each of the first converter cells and each of the second converter cells,
wherein the plurality of first converter cells are controlled not based on a circulating current circulating between the plurality of leg circuits, and the plurality of second converter cells are controlled based on the circulating current, wherein the control device executes control processing for increasing a current flowing through at least one of the plurality of second converter cells when a voltage at the capacitor in the at least one of the plurality of second converter cells becomes less than a first threshold, and wherein the control device executes processing for controlling the plurality of first converter cells as the control processing so as to increase an amplitude value of an AC current output from the power conversion circuit unit.

7. The power conversion device according to claim 6, wherein while maintaining total power of drive power for driving an auxiliary machine including the control device and active power output from the power conversion circuit unit, the control device controls the plurality of first converter cells to change the active power so as to increase the amplitude value of the AC current.

8. The power conversion device according to claim 7, wherein the control device stops the control processing when voltages at all the capacitors in the plurality of second converter cells become equal to or greater than a second threshold value.

9. The power conversion device according to claim 6, wherein while maintaining total power of first reactive power output from the power conversion circuit unit and second reactive power output from a reactive power compensation device provided in parallel with the power conversion device, the control device controls the plurality of first converter cells to change the second reactive power so as to increase the amplitude value of the AC current.

10. The power conversion device according to claim 9, wherein the control device stops the control processing when voltages at all the capacitors in the plurality of second converter cells become equal to or greater than a second threshold value.

11. The power conversion device according to claim 6, wherein the control device stops the control processing when voltages at all the capacitors in the plurality of second converter cells become equal to or greater than a second threshold value.

12. A power conversion device that performs power conversion between a DC circuit and an AC circuit, the power conversion device comprising:

a power conversion circuit unit including a plurality of leg circuits corresponding to a plurality of phases of the AC circuit, each of the leg circuits including a plurality of first converter cells each having a capacitor and connected in series to each other and a plurality of second converter cells each having a capacitor and connected in series to each other; and a control device to control operations of each of the first converter cells and each of the second converter cells, wherein the plurality of first converter cells are controlled not based on a circulating current circulating between the plurality of leg circuits, and the plurality of second converter cells are controlled based on the circulating current, wherein the control device executes control processing for increasing a current flowing through at least one of the plurality of second converter cells when a voltage at the capacitor in the at least one of the plurality of second converter cells becomes less than a first threshold, and wherein the control device executes processing for controlling the plurality of first converter cells as the control processing so as to increase an absolute value of a DC current output from the power conversion circuit unit.

13. The power conversion device according to claim 12, wherein the plurality of leg circuits are connected in parallel to each other between a high potential-side DC terminal and a low potential-side DC terminal, and the control device controls the plurality of first converter cells to increase the absolute value of the DC current while changing a direction of the DC current such that a difference between a time average value of first DC power output from the power conversion circuit unit to the DC circuit when a DC current flows from the DC circuit to the high potential-side DC terminal and a time average value of second DC power output from the power conversion circuit unit to the DC circuit when the DC current flows from the DC circuit to the low potential-side DC terminal becomes a desired DC power.

14. The power conversion device according to claim 13, wherein the control device stops the control processing when voltages at all the capacitors in the plurality of second converter cells become equal to or greater than a second threshold value.

15. The power conversion device according to claim 12, wherein the control device stops the control processing when voltages at all the capacitors in the plurality of second converter cells become equal to or greater than a second threshold value.

16. A power conversion device that performs power conversion between a DC circuit and an AC circuit, the power conversion device comprising:

a power conversion circuit unit including a plurality of leg circuits corresponding to a plurality of phases of the AC circuit, each of the leg circuits including a plurality of first converter cells each having a capacitor and connected in series to each other and a plurality of second converter cells each having a capacitor and connected in series to each other; and a control device to control operations of each of the first converter cells and each of the second converter cells, wherein the plurality of first converter cells are controlled not based on a circulating current circulating between the plurality of leg circuits, and the plurality of second converter cells are controlled based on the circulating current, wherein the control device executes control processing for increasing a current flowing through at least one of the plurality of second converter cells when a voltage at the capacitor in the at least one of the plurality of second converter cells becomes less than a first threshold, and wherein the control device executes processing for changing a transformation ratio of a transformer provided between the AC circuit and the power conversion circuit unit as the control processing so as to increase an amplitude value of the AC current output from the power conversion circuit unit.

17. The power conversion device according to claim 16, wherein the control device stops the control processing when voltages at all the capacitors in the plurality of second converter cells become equal to or greater than a second threshold value.

* * * * *